United States Patent Office 3,110,397
Patented Nov. 12, 1963

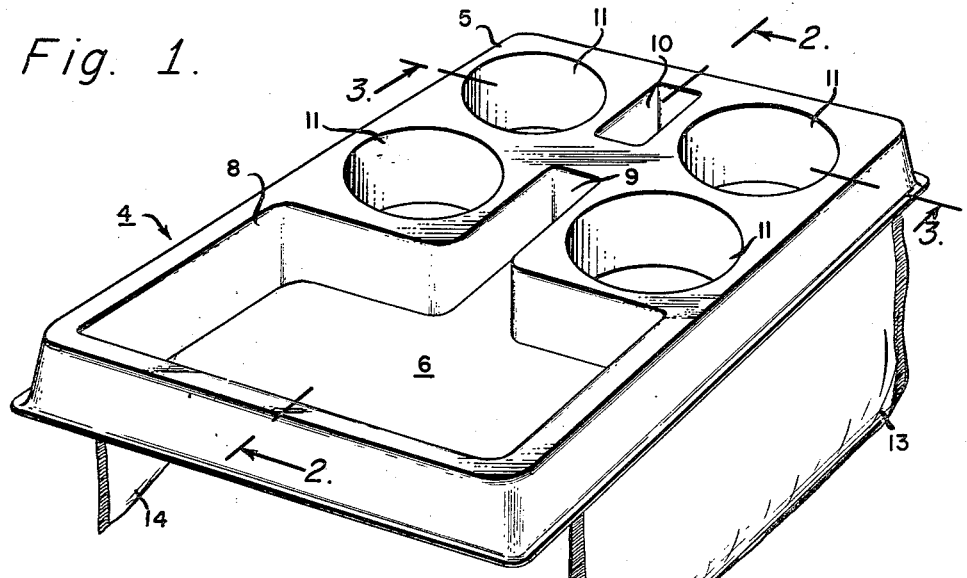
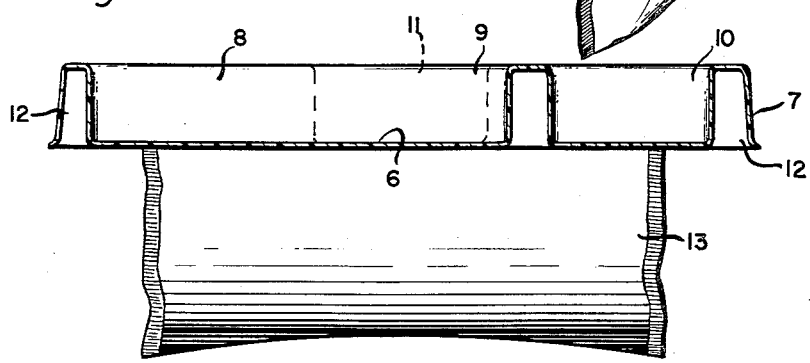
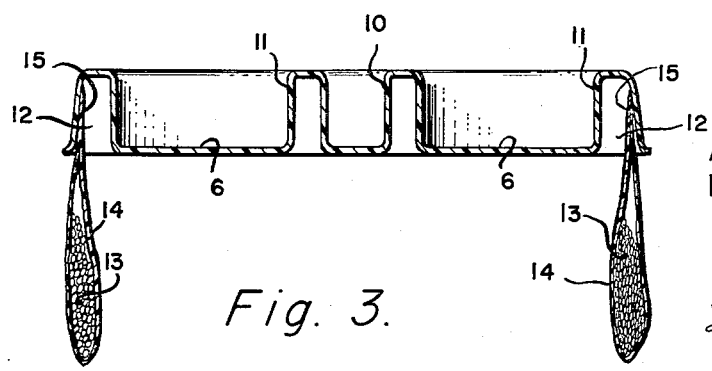
Allan Warren Peck,
Martin W. Glassman,
INVENTORS.
BY.
Leonard Golove
ATTORNEY.

3,110,397
RECEPTACLE OR TRAY
Allan Warren Peck, 7643 Sausalito Ave., Los Angeles, Calif., and Martin Walter Glassman, 1608 9th St., Manhattan Beach, Calif.
Filed Feb. 5, 1962, Ser. No. 170,978
2 Claims. (Cl. 206—19.5)

The present invention relates to a receptacle or tray for food, drinking cups, cans, bottles, boxes, or the like and is particularly adapted to resist shifting, tipping, slipping or any relative motion between the tray and its support, particularly when the support is in motion.

Many trays or receptacles have been designed and are presently available for use within a moving vehicle such as an automobile, boat, or the like. However, the existence of external forces produced by the motion of the vehicle has required an attachment of the tray to an extending portion of the vehicle. As an example, many such trays are adapted to be attached to the window frame or the window of an automobile. However, the requirement that the vehicle have a suitable place of attachment which is also convenient to the user of the tray, has limited the utility of such a tray to the user. In the example given, the attachment to the window or the window frame of an automobile is generally inconvenient to the driver of the automobile and even somewhat dangerous to his operation of his vehicle, since the driver is required to reach across to the opposite window bearing the attached tray. The attachment process itself is generally an annoyance and in some cases, the attachment tends to mar or deface that portion of the vehicle to which the attachment is made. This invention provides a receptacle or tray which overcomes the disadvantages listed above and which provides many additional advantages. The tray is suitable for installation in a moving vehicle or in any situation in which an extremely stable receptacle is desired. It is relatively simple to fabricate, it is shatterproof, washable, noncorroding and stain resistant and is relatively light in weight, so that it may be hand-carried with ease. The configuration or shape of the tray has been carefully chosen to provide maximum stability of the contents when the tray is in motion, and maximum convenience to the user. The overall size of the tray makes it suitable for storage under the seat of most vehicles.

The tray does not require a permanent attachment to the vehicle or other supporting structure, and may be installed in many locations within a vehicle. In contrast to prior art trays, the present invention may be used where it is most accessible to the user. It may be used where it does not obstruct the vision of the driver of the vehicle and where it does not interfere with passenger seating nor with ingress and egress to the vehicle.

Briefly described, the present invention comprises a substantially rectangular tray and a pair of distributed weights mounted, one on each side of the tray. The particular configuration of the tray along with the use of distributed weights provides the relatively high degree of stability which has been discussed above.

Accordingly, an object of the present invention is to provide a novel and improved receptacle or tray which will not move relative to its supporting surface.

Another object of the present invention is to provide a tray which resists external forces applied thereto and tending to move the tray.

Still another object of the present invention is to provide a tray which minimizes or prevents relative motion between the tray and the contents thereof.

A further object of the present invention is to provide a tray or receptacle suitable for use in a moving vehicle, which can be simply and easily installed at convenient locations within said vehicle.

A still further object of the present invention is to provide a tray which is relatively simple and inexpensive to manufacture.

Other and more specific objects of the present invention will become apparent from a consideration of the following description taken in conjunction with the accompanying drawings, in which like components are designated by the same reference characters and in which:

FIG. 1 is a perspective view of the present invention;
FIG. 2 is a view in cross-section of the present invention taken along the line 2—2 in FIG. 1;
FIG. 3 is a view in cross-section of the present invention taken along the line 3—3 in FIG. 1.

Referring now to the drawings, there is shown a substantially rectangular tray 4, which may have rounded corners as shown. The tray 4 is formed from a single flat sheet of plastic or other suitable material which may be molded or pressed into the desired configuration. Suitable dimensions for the tray, as shown, have been found to be approximately 9″ in width, 11″ in length, and 1¼″ in depth. While the present invention is not to be construed to be limited to the dimensions given above, the size described has been found to represent a useful compromise between the desire for maximum capacity and the necessity for space restriction within a typical moving vehicle.

The surface of the tray 4 comprises an upper portion 5 and a depressed or lower portion 6. The sides 7 of the tray may be flanged as shown to provide a better contact surface with that portion of the vehicle within which the tray is installed and upon which the tray rests.

The objects to be contained within the tray are to be placed within a set of receptacles provided therefor. These receptacles have a suitable size and shape to contain efficiently those articles which are most commonly necessary to a user of the tray. A relatively large receptacle 8, substantially rectangular in shape, may be used to contain food or the like and is sufficiently deep to prevent sliding of the contents. Adjacent the receptacle 8 and continuous therewith, is a smaller rectangular receptacle 9, which is particularly adapted to contain eating utensils or the like but which may also be used to contain many other objects. The combined receptacles 8 and 9 are located at one end of the surface of the tray 4, and occupy between one-third and one-half of that surface.

Adjacent one end of the receptacle 9, but separated therefrom, is an additional rectangular receptacle 10 which is particularly adapted to receive a package of cigarettes or the like. The receptacles 9 and 10 are symmetrically distributed about the center line or the axis of symmetry of the tray 4. On each side of the axis of symmetry of the tray 4 are located a pair of receptacles 11 having a circular cross-section. Each of the circular receptacles 11 is adapted to contain a drinking cup, a bottle or similar cylindrical object. The depth of the receptacles (1¼″) is sufficient to be effective to prevent any motion of the objects contained within the receptacles, relative to the receptacles themselves.

The structure of the tray 4, as has been described, results in the existence of a channel 12 around the perimeter of the tray 4. Along of each of the two sides of the tray parallel to the axis of symmetry of the tray and adjacent those portions of the channel 12 forming said sides, a distributed balance or weight is attached to the tray. Each of the distributed balances or weights comprises a bag 13, which may be composed of a plastic or other flexible cloth-like material, containing a suitable amount of an aggregate material such as shot or gravel or a fluid material. The shot or gravel 14 is distributed within the bag 13 so that its weight tends to be relatively evenly distributed along the entire length of the bag 13. Each of the distributed weights is attached to one of the sides of the tray, as described, by a connection 15 made between the bag 13 and the outer edge of the channel 12. The connection 15 may be mechanical, such as a stapled or rivetted joint, or it may be a cemented or glued union.

There has thus been described, a novel and improved receptacle or tray which provides the above-listed advantages over the prior art. It should be noted that materials have been specified and dimensions given. However, the invention is not to be construed as limited thereto but rather should be given the scope and breadth of the appended claims.

It is therefore claimed:

1. A receptacle adapted for use in a moving vehicle comprising: a substantially rectangular symmetrical tray having a surface adapted to contact that portion of said vehicle upon which the tray rests and provided with a plurality of receptacles recessed therein and having a pair of parallel sides; and a pair of equal distributed weights, each weight having an elongated edge and each said weight being attached to a diametrically opposed side along said elongated edge of said weight and in alignment with the other of said weights, and in which the length of said edge is substantially equal to the length of a side and each of said weights comprises a bag composed of cloth-like material containing an aggregate material, whereby when the tray is supported in a moving vehicle, it will be in balance.

2. A receptacle adapted for use in a moving vehicle comprising: a substantially rectangular symmetrical tray having a surface adapted to contact that portion of said vehicle upon which the tray rests and provided with a plurality of receptacles recessed therein and having a pair of parallel sides, and a pair of equal distributed weights, each weight having an elongated edge and each said weight being attached to a diametrically opposed side along said elongated edge of said weight and in alignment with the other of said weights, and in which the length of said edge is substantially equal to the length of a side and each of said weights comprises a bag composed of cloth-like material containing a fluid material, whereby when the tray is supported in a moving vehicle, it will be in balance.

References Cited in the file of this patent

UNITED STATES PATENTS

| | | |
|---|---|---|
| 1,725,508 | Clifford | Aug. 20, 1929 |
| 2,826,347 | Schiavo | Mar. 11, 1958 |
| 2,895,609 | Rajotte | July 21, 1959 |

FOREIGN PATENTS

| | | |
|---|---|---|
| 202,869 | Great Britain | Aug. 30, 1923 |